(12) United States Patent
Yasuda et al.

(10) Patent No.: US 9,285,537 B2
(45) Date of Patent: Mar. 15, 2016

(54) OPTICAL WIRING SUBSTRATE, MANUFACTURING METHOD OF OPTICAL WIRING SUBSTRATE AND OPTICAL MODULE

(71) Applicant: Hitachi Metals, Ltd., Tokyo (JP)

(72) Inventors: Hiroki Yasuda, Mito (JP); Kouki Hirano, Hitachinaka (JP); Hiroshi Ishikawa, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/200,065

(22) Filed: Mar. 7, 2014

(65) Prior Publication Data

US 2014/0334771 A1    Nov. 13, 2014

(30) Foreign Application Priority Data

May 7, 2013    (JP) ................. 2013-097752

(51) Int. Cl.
*G02B 6/42* (2006.01)
*G02B 6/12* (2006.01)
*G02B 6/132* (2006.01)
*G02B 6/136* (2006.01)

(52) U.S. Cl.
CPC ............ *G02B 6/12004* (2013.01); *G02B 6/132* (2013.01); *G02B 6/136* (2013.01); *G02B 6/4214* (2013.01)

(58) Field of Classification Search
CPC .................................... G02B 6/12004
See application file for complete search history.

(56) References Cited

U.S. PATENT DOCUMENTS

| 6,257,772 B1* | 7/2001 | Nakanishi et al. ............. 385/89 |
| 6,947,645 B2 | 9/2005 | Korenaga et al. |
| 2003/0118288 A1 | 6/2003 | Korenaga et al. |
| 2013/0064499 A1* | 3/2013 | Satoh et al. ..................... 385/14 |

FOREIGN PATENT DOCUMENTS

JP    2003-167175    6/2003

* cited by examiner

*Primary Examiner* — Omar R Rojas
(74) *Attorney, Agent, or Firm* — Roberts Mlotkowski Safran & Cole, PC

(57) ABSTRACT

An optical wiring substrate includes an insulation layer including a resin, an conductor layer formed on the insulation layer and including a metal, and an optical fiber accommodating part configured to accommodate an end part of an optical fiber. The conductor layer further includes a reflecting surface configured to be inclined relative to the insulation layer so as to reflect a light that propagates through the optical fiber. The optical fiber accommodating part includes at one end part thereof an abutting surface configured such that a tip of optical fiber inserted is abutted thereon.

5 Claims, 8 Drawing Sheets

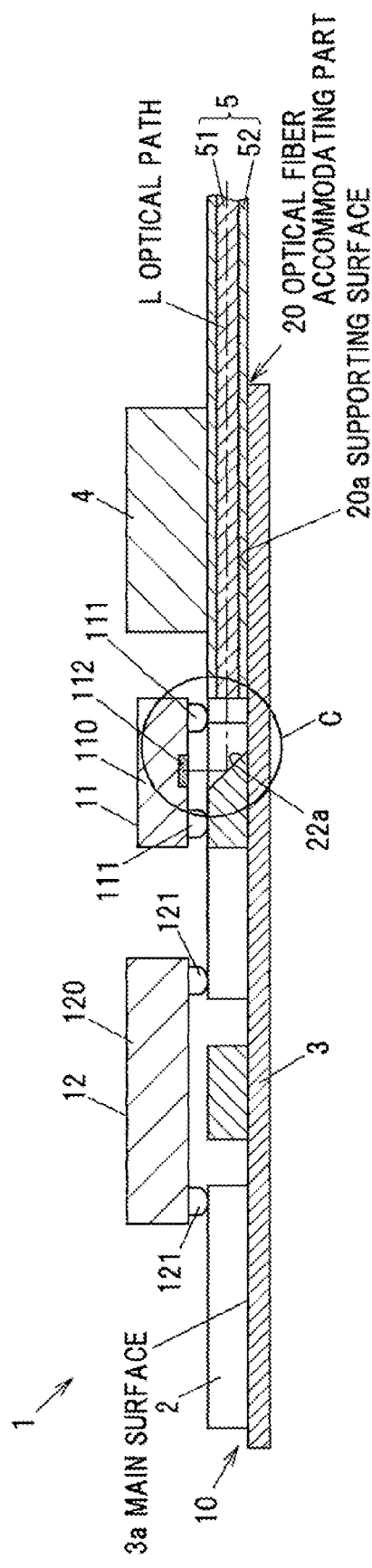
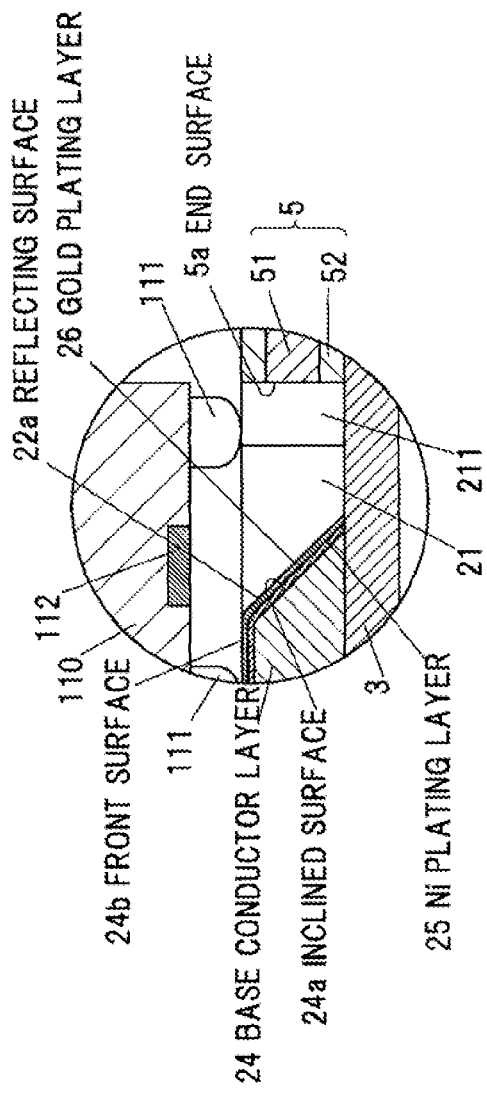

211a FIRST ABUTTING SURFACE
221a SECOND ABUTTING SURFACE

OPTICAL WIRING SUBSTRATE, MANUFACTURING METHOD OF OPTICAL WIRING SUBSTRATE AND OPTICAL MODULE

The present application is based on Japanese patent application No. 2013-097752 filed on May 7, 2013, the entire contents of which are incorporated herein by reference.

BACKGROUND OF THE INVENTION

1. Field of the Invention

This invention relates to an optical wiring substrate configured to accommodate an optical fiber, a manufacturing method of the optical wiring substrate and an optical module using the optical wiring substrate.

2. Description of the Related Art

As a conventional optical wiring substrate, for example, an optical mounting substrate is known which is configured to have a groove for holding an optical fiber and on which a photoelectric conversion element is mounted (See e.g., JP-A-2003-167175).

The optical mounting substrate disclosed in JP-A-2003-167175 is formed by pushing a metal mold having triangular prismatic projections on to a substrate material softened by high temperature heating so as to transfer the inverted shape of the projection of the metal mold on to the substrate material. The optical mounting substrate has a guide groove configured to carry out the positioning of the optical fiber and a taper surface formed at the end edge of the guide groove and inclined relative to the surface of the optical mounting substrate. In the taper surface, a mirror configured to reflect a light that propagate through the optical fiber is formed. The optical fiber is mounted and fixed in the guide groove by using, for example, an ultraviolet curing resin. Above the taper surface, a photodiode configured to receive the light reflected by the mirror is mounted.

SUMMARY OF THE INVENTION

In the optical mounting substrate disclosed in JP-A-2003-167175, the taper surface is continuously formed in the guide groove, thus there is a possibility that when the optical fiber is inserted into the guide groove, the tip of the optical fiber runs on the taper surface. In this case, there is a risk that the optical fiber running on the taper surface pushes up the photodiode mounted above the taper surface so that the photodiode is removed from the optical mounting substrate.

It is an object of the invention to provide an optical wiring substrate that is capable of accurately positioning the optical fiber, as well as a manufacturing method of the optical wiring substrate and an optical module using the optical wiring substrate.

(1) According to one embodiment of the invention, an optical wiring substrate comprises:

an insulation layer comprising a resin;

an conductor layer formed on the insulation layer and comprising a metal; and an optical fiber accommodating part configured to accommodate an end part of an optical fiber, wherein the conductor layer further comprises a reflecting surface configured to be inclined relative to the insulation layer so as to reflect a light that propagates through the optical fiber, and wherein the optical fiber accommodating part comprises at one end part thereof an abutting surface configured such that a tip of optical fiber inserted is abutted thereon.

(2) According to another embodiment of the invention, an optical module substrate comprises:

the optical wiring substrate according to the above embodiment (1); and a photoelectric conversion element.

(3) According to another embodiment of the invention, a manufacturing method of the optical wiring substrate according to the above embodiment (1) comprises:

forming the conductor layer on the insulation layer;

removing a part of the conductor layer so as to form a wiring pattern and the optical fiber accommodating part and to form the abutting surface at one end of the optical fiber accommodating part; and forming an inclined surface as the reflecting surface on a part of the wiring pattern, wherein the abutting surface is formed as a part of the conductor layer.

(4) According to another embodiment of the invention, a manufacturing method of the optical wiring substrate according to the above embodiment (1) comprises:

forming the conductor layer on the insulation layer;

removing a part of the conductor layer so as to form a wiring pattern and a concave part as the optical fiber accommodating part; and forming an inclined surface as the reflecting surface on a part of the wiring pattern; and removing the insulation layer corresponding to a bottom surface of the concave part so as to form the optical fiber accommodating part and to form the abutting surface at one end of the optical fiber accommodating part, wherein the abutting surface is formed as a part of the insulation layer.

Effects of the Invention

According to one embodiment of the invention, an optical wiring substrate can be provided that is capable of accurately positioning the optical fiber, as well as a manufacturing method of the optical wiring substrate and an optical module using the optical wiring substrate.

BRIEF DESCRIPTION OF THE DRAWINGS

The preferred embodiments according to the invention will be explained below referring to the drawings, wherein:

FIG. 3A is a cross-sectional view taken along the line B-B in FIG. 1;

FIG. 3B is a partial enlarged view of C part in FIG. 3A;

DETAILED DESCRIPTION OF THE PREFERRED EMBODIMENTS

[First Embodiment]

Figure 1:
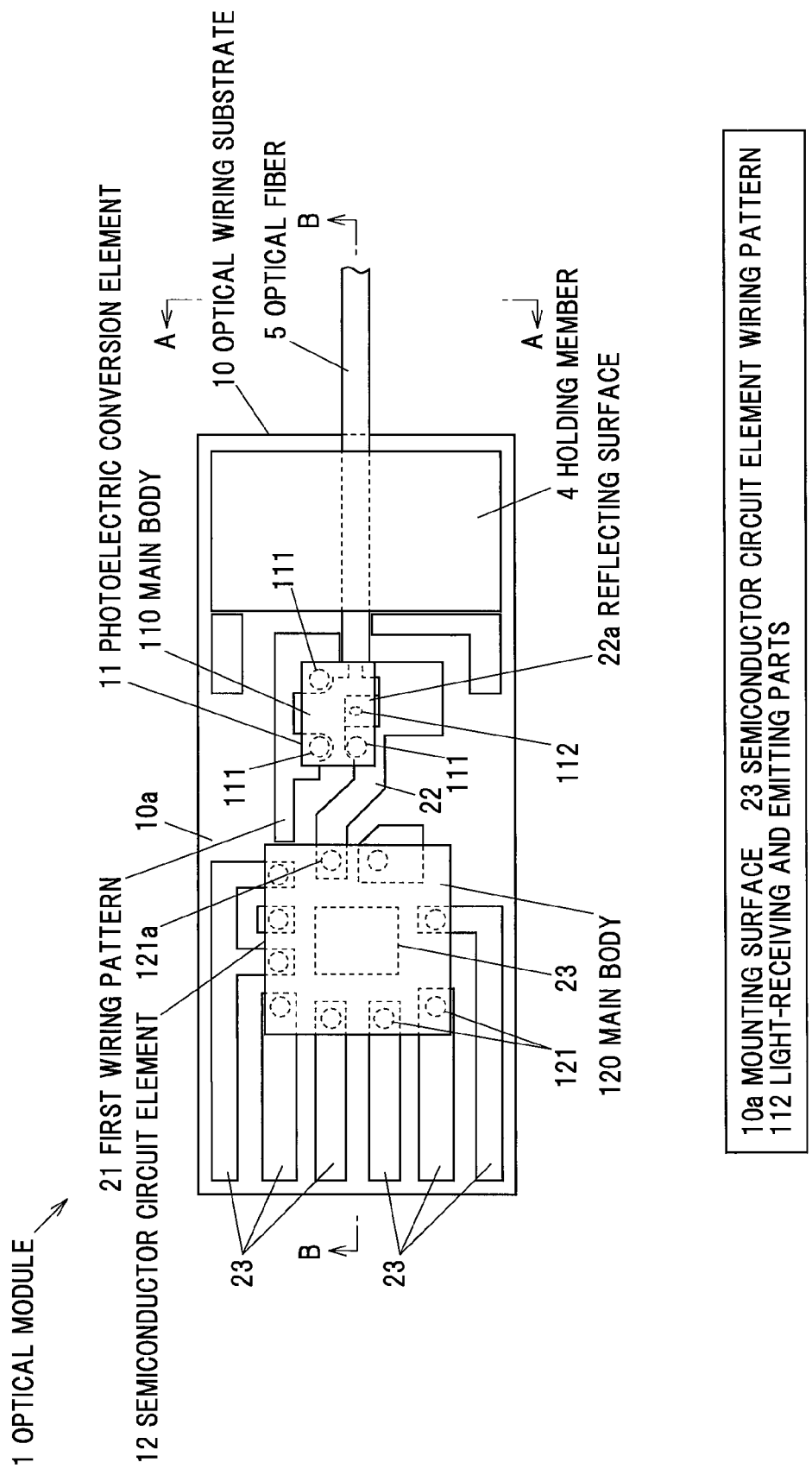
FIG. 1 is a plan view schematically showing a configuration example of an optical wiring substrate and an optical module including the optical wiring substrate according to a first embodiment of the invention.

FIG. 1 is a plan view schematically showing a configuration example of an optical wiring substrate and an optical module including the optical wiring substrate according to a first embodiment of the invention.

(Configuration of Optical Module 1)

The optical module 1 includes an optical wiring substrate 10, a photoelectric conversion element 11 mounted on a mounting surface 10a of the optical wiring substrate 10 by flip-chip mounting and a semiconductor circuit element 12 electrically connected to the photoelectric conversion element 11.

The photoelectric conversion element 11 is configured such that a plurality (three in the embodiment) of electrodes 111 are disposed in a main body 110. Two electrodes 111 of the three electrodes 111 are electrically connected to a first wiring pattern 21 formed in the mounting surface 10a of the optical wiring substrate 10. Remaining one electrode 111 is electrically connected to a second wiring pattern 22 formed in the mounting surface 10a of the optical wiring substrate 10. In the second wiring pattern 22, a reflecting surface 22a configured to reflect a light that propagates through the optical fiber 5 is formed. The photoelectric conversion element 11 is mounted above the reflecting surface 22a.

In the embodiment, the photoelectric conversion element 11 is configured such that the dimension in a direction parallel to the longitudinal direction of the optical fiber 5 is, for example, 350 μm, and the dimension in a direction (a short direction) perpendicular to the longitudinal direction of the optical fiber 5 is, for example, 250 μm.

The photoelectric conversion element 11 is an element configured to convert electric signals to optical signals or convert optical signals to electric signals. The former example includes a light emitting element such as a semiconductor laser element, a LED (Light Emitting Diode). In addition, the latter example includes a light receiving element such as a photo diode. The photoelectric conversion element 11 is configured to emit or receive a light from a light-receiving and emitting part 112 formed in the side of the mounting surface 10a of the optical wiring substrate 10 in a direction perpendicular to the optical wiring substrate 10.

The semiconductor circuit element 12 is mounted on the mounting surface 10a of the optical wiring substrate 10 by flip-chip mounting, and is configured such that a plurality (ten in the embodiment) of pad electrodes 121 are disposed in a main body 120. The plural pad electrodes 121 are electrically connected to the semiconductor circuit element wiring pattern 23 respectively. Of the plural pad electrodes 121, a pad electrode 121a configured to transmit signals is connected to the second wiring pattern 22 to which one electrode 111 of the photoelectric conversion element 11 is connected, thereby the semiconductor circuit element 12 and the photoelectric conversion element 11 are electrically connected to each other.

If the photoelectric conversion element 11 is configured to convert electric signals to optical signals, the semiconductor circuit element 12 is a driver IC configured to drive the photoelectric conversion element 11. If the photoelectric conversion element 11 is configured to convert optical signals to electric signals, the semiconductor circuit element 12 is a receiver IC configured to amplify signals input from the photoelectric conversion element 11.

Further, the optical wiring substrate 10 can be configured such that electronic components, other than the photoelectric conversion element 11 and the semiconductor circuit element 12, such as a connector, an IC (Integrated Circuit), or an active element (a transistor and the like), a passive element (a resistor, a condenser and the like) are mounted thereon.

The optical fiber 5 is arranged such that the end surface thereof faces the reflecting surface 22a formed in the second wiring pattern 22, and the optical fiber 5 is configured to be held by a holding member 4 from a position above the mounting surface 10a of the optical wiring substrate 10.

(Configuration of Optical Wiring Substrate 10)

Figure 2:
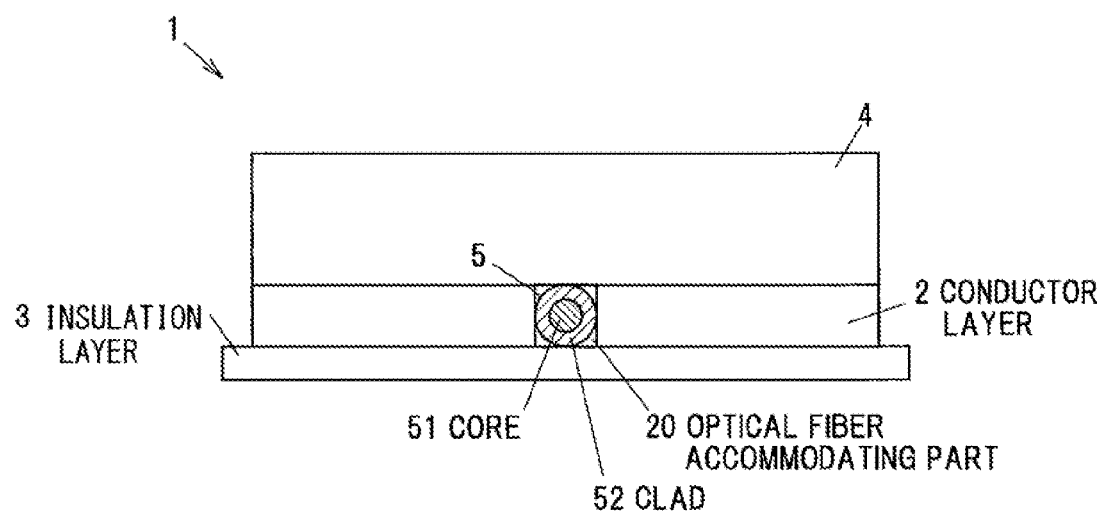
FIG. 2 is a cross-sectional view taken along the line A-A in FIG. 1.

FIG. 2 is a cross-sectional view taken along the line A-A in FIG. 1. FIG. 3A is a cross-sectional view taken along the line B-B in FIG. 1 and FIG. 3B is a partial enlarged view of C part in FIG. 3A.

The optical wiring substrate 10 includes an insulation layer 3 comprised of a resin and an conductor layer 2 laminated on a main surface 3a of the insulation layer 3 and comprised of a metal, the conductor layer 2 having a reflecting surface 22a that is inclined relative to the insulation layer 3. In the embodiment, the angle formed between the reflecting surface 22a and the main surface 3a of the insulation layer 3 is 45 degrees.

The first wiring pattern 21, the second wiring pattern 22 and the semiconductor circuit element wiring pattern 23 constitutes a part pf the conductor layer 2, and the reflecting surface 22a is formed in the end surface of the second wiring pattern 22. In addition, an optical fiber accommodating part 20 configured to accommodate the end part of the second wiring pattern 22 is formed in the conductor layer 2.

The conductor layer 2 is, for example, includes a base conductor layer 24 comprised of a good conductive metal such as copper, a Ni plating layer 25 comprised of nickel (Ni) and a gold plating layer 26 comprised of gold (Au), the (Ni) and (Au) plating layers being laminated on the surface 24b of the base conductor layer 24. The conductor layer 2 has a thickness of, for example, 70 to 80 μm.

As shown in FIG. 3B, the Ni plating layer 25 and the gold plating layer 26 are also laminated on the surface of the inclined surface 24a formed in the base conductor layer 24. The reflecting surface 22a is formed on the outermost surface of the gold plating layer 26.

The insulation layer 3 is comprised of, for example, a resin such as polyimide, and the thickness thereof is, for example, 38 μm. The insulation layer 3 has a supporting surface 20a configured to support the optical fiber 5 accommodated in the optical fiber accommodating part 20. More particularly, the optical fiber accommodating part 20 passes through the conductor layer 2 over the whole of the conductor layer 2 in the thickness direction, and the main surface 3a of the insulation layer 3 is exposed. Accordingly, the main surface 3a of the insulation layer 3 is configured such that a part thereof is formed as the supporting surface 20a of the optical fiber accommodating part 20.

The optical fiber accommodating part 20 is covered by the holding member 4 from a position above the conductor layer 2 and the optical fiber 5 is fixed by an adhesive agent or the like that is filled in the optical fiber accommodating part 20. In the embodiment, the clad 52 of the optical fiber 5 is configured such that the peripheral surface thereof is in contact with the inner surface of the optical fiber accommodating part 20.

In the one end part (the end edge) of the optical fiber accommodating part 20, a first convex part 211 and a second convex part 221 that are configured to project toward the inside are formed. Further, in FIG. 3A and FIG. 3B, only the first convex part 211 is shown (refer to FIG. 4).

The reflecting surface 22a is formed at a position facing the core 51 of the optical fiber 5 accommodated in the optical fiber accommodating part 20. As shown in FIG. 3A, when a light that propagates through the optical fiber 5 is emitted from the core 51, the reflecting surface 22a is configured to reflect the emitted light toward the photoelectric conversion element 11. If the photoelectric conversion element 11 is a light receiving element, the light reflected by the reflecting surface 22a enters into the photoelectric conversion element 11 from the light-receiving and emitting parts 112 formed in the main body 110 of the photoelectric conversion element 11, and the photoelectric conversion element 11 converts optical signals due to the incident light to electric signals.

If the photoelectric conversion element 11 is a light emitting element, the photoelectric conversion element 11 converts electric signals output from the semiconductor circuit element 12 to optical signals, and emits the light exhibiting the optical signals from the light-receiving and emitting parts 112. The emitted light is reflected by the reflecting surface 22a toward the end surface 5a of the optical fiber 5 so as to enter into the core 51 and propagate through the optical fiber 5. FIG. 3A shows an optical path L of the light of which propagation medium is the optical fiber 5 by an alternate long and short dash line.

The optical fiber 5 includes the core 51 and the clad 52. In the embodiment, the optical fiber 5 is configured such that the core 51 has a diameter of, for example, 50 μm, and the clad has a thickness in a radial direction of, for example, 15 μm. Namely, the optical fiber 5 has a diameter (a diameter obtained by summing the core 51 and the clad 52) of 80 μm, the dimension is nearly equal to the thickness of the conductor layer 2.

Figure 4A:
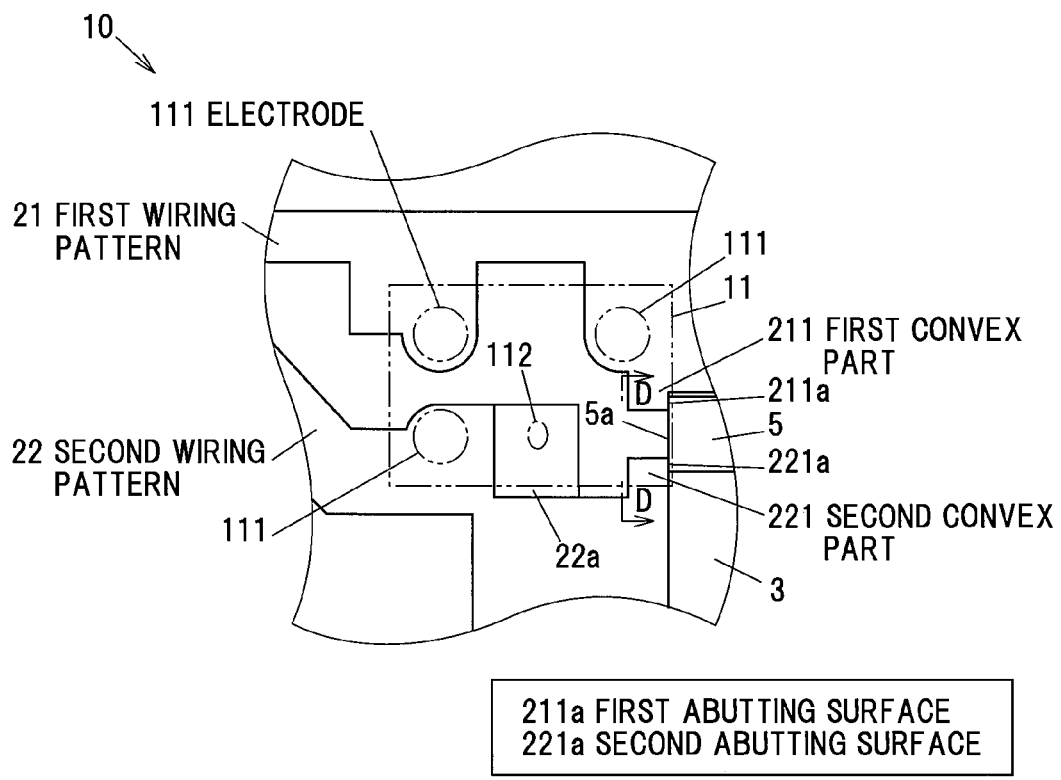
FIG. 4A is a partial enlarged view of a photoelectric conversion element and a peripheral part thereof in FIG. 1.
Figure 4B:
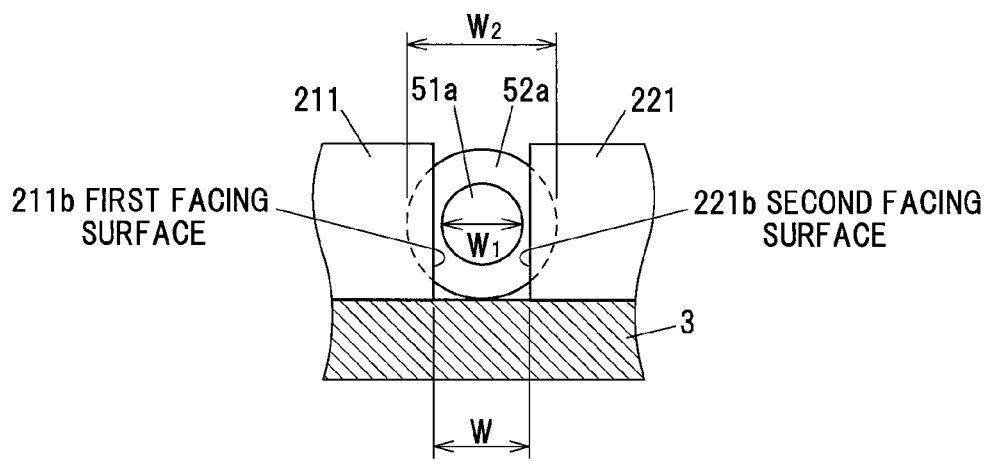
FIG. 4B is a cross-sectional view taken along the line D-D in FIG. 4A.

FIG. 4A is a partial enlarged view of the photoelectric conversion element 11 and the peripheral part thereof in FIG. 1, and FIG. 4B is a cross-sectional view taken along the line D-D in FIG. 4A. Further, FIG. 4A shows the outline of the photoelectric conversion element 11 by an alternate long and two short dashes line.

In the first wiring pattern 21 formed in the conductor layer 2, the first convex part 211 projecting toward the second wiring pattern 22 is formed, and in the second wiring pattern 22, the second convex part 221 projecting toward the first wiring pattern 21 is formed.

The first convex part 211 and the second convex part 221 are interposed between the reflecting surface 22a formed in the second wiring pattern 22 and the optical fiber accommodating part 20. The first convex part 211 has a first abutting surface 211a on which the end surface 5a of the optical fiber 5 is abutted, in an opposite side to the surface facing the reflecting surface 22a. Similarly, the second convex part 221 has a second abutting surface 221a on which the end surface 5a of the optical fiber 5 is abutted, in an opposite side to the surface facing the reflecting surface 22a. In other words, the first abutting surface 211a and the second abutting surface 221a are formed at the one end part (the end edge) of the optical fiber accommodating part 20.

As shown in FIG. 4B, a distance W between a first facing surface 211b of the first convex part 211 facing the second convex part 221 and a second facing surface 221b of the second convex part 221 facing the first convex part 211 is wider than the diameter $W_1$ of the core 51 of the optical fiber 5 and is narrower than the whole diameter $W_2$ of the optical fiber 5. Namely, the end surface 52a of the clad 52 of the optical fiber 5 is in contact with the first abutting surface 211a and the second abutting surface 221a. The end surface 5a of the core 51 is exposed between the first convex part 211 and the second convex part 221.

(Manufacturing Method of the Optical Wiring Substrate 10)

Next, a manufacturing method of the optical wiring substrate 10 will be explained referring to FIGS. 5A to 5C.

Figure 5A:
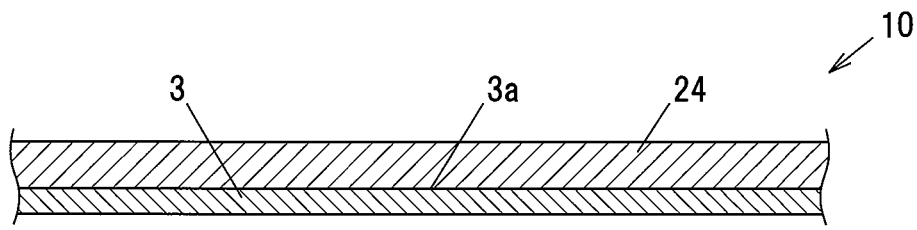
FIGS. 5A to 5C are cross-sectional views schematically showing a forming process of the optical wiring substrate.
Figure 5B:
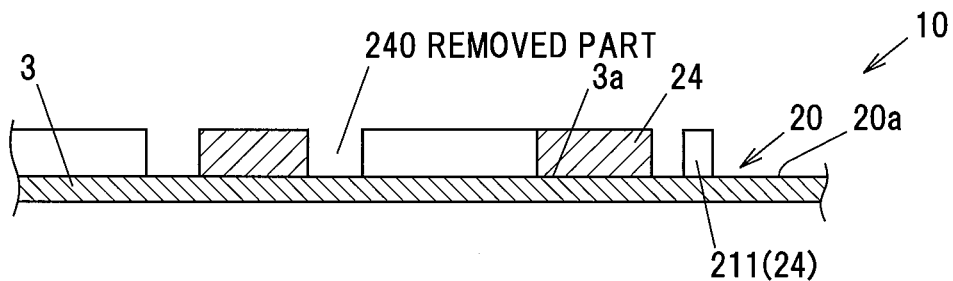
Figure 5C:
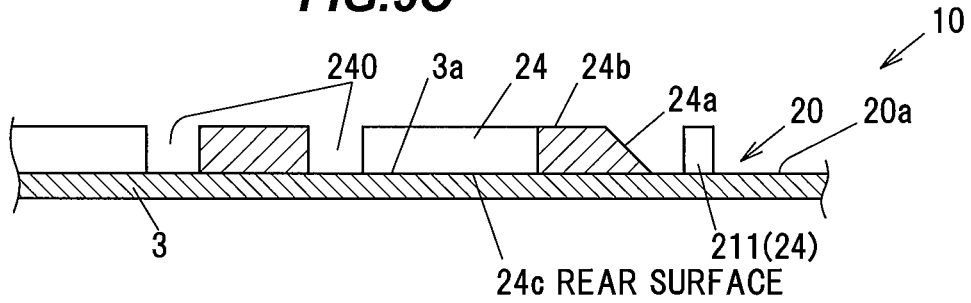

FIGS. 5A to 5C are cross-sectional views schematically showing a forming process of the optical wiring substrate 10.

The manufacturing process of the optical wiring substrate 10 includes a first step of forming the base conductor layer 24 on the main surface 3a of the insulation layer 3, a second step of removing a part of the base conductor layer 24 so as to form the wiring patterns (the first wiring pattern 21, the second wiring pattern 22, and the semiconductor circuit element wiring pattern 23) and the optical fiber accommodating part 20, and to form the first abutting surface 211a and the second abutting surface 221a at the one end of the optical fiber accommodating part 20, a third step of forming the inclined surface 24a in the base conductor layer 24, and a fourth step of laminating the Ni plating layer 25 and the gold plating layer 26 on the front surface 24b of the base conductor layer 2 and the inclined surface 24a. Hereinafter, the first to fourth steps will be explained in more detail.

As shown in FIG. 5A, in the first step, the base conductor layer 24 is formed on the whole of the main surface 3a of the insulation layer 3, for example, by adhesion, vapor deposition, or electroless plating. In the embodiment, the base conductor layer 24 is comprised of copper (Cu) as a main component that has a good electrical conductivity.

As shown in FIG. 5B, in the second step, a part of the base conductor layer 24 is removed by etching so as to respectively form the first wiring pattern 21, the second wiring pattern 22, the semiconductor circuit element wiring pattern 23 and the optical fiber accommodating part 20, and to form the first convex part 211 and the second convex part 221.

In more particular, the second step includes a step of coating a region of the base conductor layer 24 except for a part corresponding to the removed part 240 with a resist, and to dissolve a part of the base conductor layer 24 which is not coated with the resist by etching. Thereby the base conductor layer 24 corresponding to the removed part 240 is dissolved so as to leave only the base conductor layer 24 corresponding to the first wiring pattern 21, the second wiring pattern 22, the semiconductor circuit element wiring pattern 23, the optical fiber accommodating part 20, the first convex part 211 and the second convex part 221.

As shown in FIG. 5C, in the third step, the conductor layer 2 is cut obliquely from the front surface 24b to the rear surface 24c of the base conductor layer 24, thereby the inclined surface 24a is formed.

In the fourth step, platings of nickel (Ni) and gold (Au) are applied to the front surface 24b of the base conductor layer 24 and the surface of the inclined surface 24a so as to form the Ni plating layer 25 and the gold plating layer 26. The nickel (Ni) plating, the gold (Au) plating and the like can be carried out by, for example, electroless plating. The reflecting surface 22a is formed on the outermost surface of the gold plating layer 26.

(Operation and Advantage of the Embodiment)

According to the above-mentioned embodiment, the following operation and advantage can be obtained.

(1) In the one end part (the end edge) of the optical fiber accommodating part 20, the first abutting surface 211a and the second abutting surface 221a are formed, thus the optical fiber 5 abutted on the first abutting surface 211a and the second abutting surface 221a is accurately positioned. The first convex part 211 and the second convex part 221 in which the first abutting surface 211a and the second abutting surface 221a are formed are arranged between the reflecting surface 22a and the optical fiber accommodating part 20, thus the tip of the optical fiber 5 is prevented from running on the reflecting surface 22a so that the photoelectric conversion element 11 can be prevented from being removed from the optical wiring substrate 10.

(2) The first abutting surface 211a and the second abutting surface 221a are formed in the first wiring pattern 21 and the second wiring pattern 22, namely in the conductor layer 2, thus when the first wiring pattern 21, the second wiring pattern 22 and the optical fiber accommodating part 20 are formed, the first abutting surface 211a and the second abutting surface 221a can be formed together, so as to lead to improvement in workability.

(Second Embodiment)

Next, the second embodiment according to the invention will be explained referring to FIGS. 6 to 8. The optical wiring substrate 10A according to the embodiment is configured such that the structure of the optical fiber accommodating part 30 is different from that of the optical fiber accommodating part 20 of the optical wiring substrate 10 according to the first embodiment. In FIGS. 6 to 8, with regard to components having the same structure and function as those explained for the optical wiring substrate 10 used in the first embodiment, the same reference numerals will be used therefor, and the overlapped explanation will be omitted.

Figure 6A:
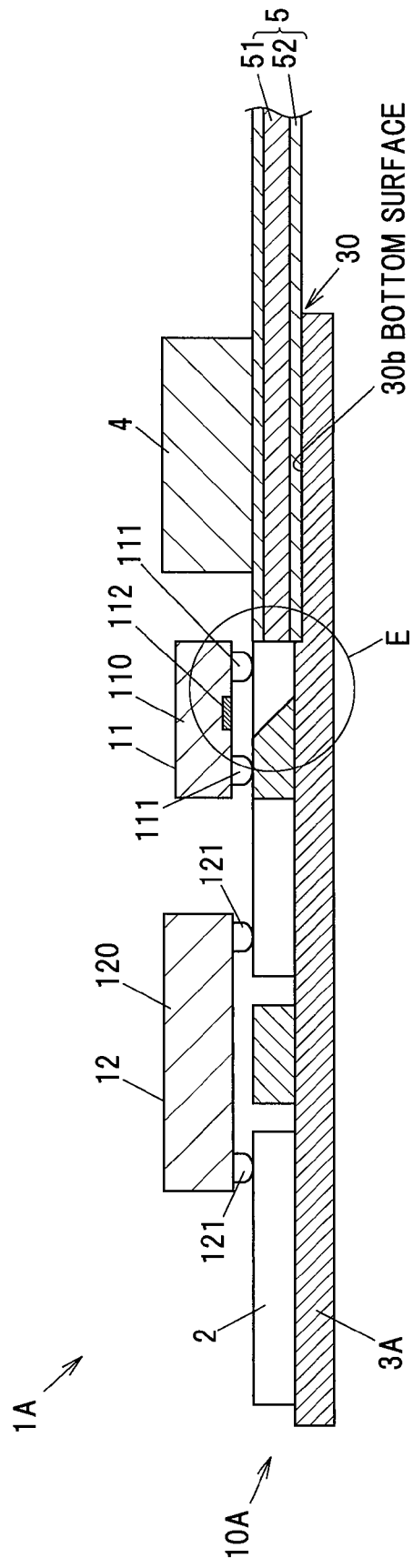
FIG. 6A is a cross-sectional view schematically showing an optical module according to a second embodiment of the invention.
Figure 6B:
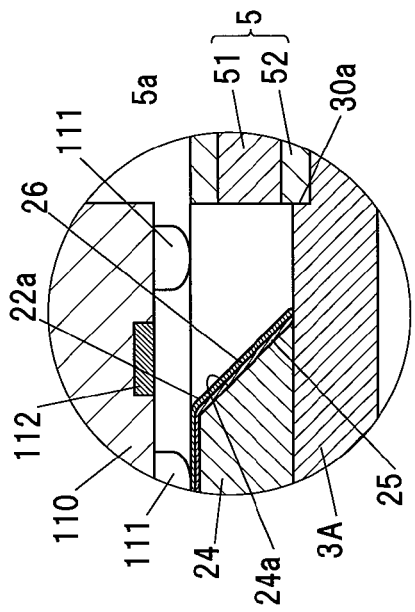
FIG. 6B is a partial enlarged view of E part in FIG. 6A.
Figure 7A:
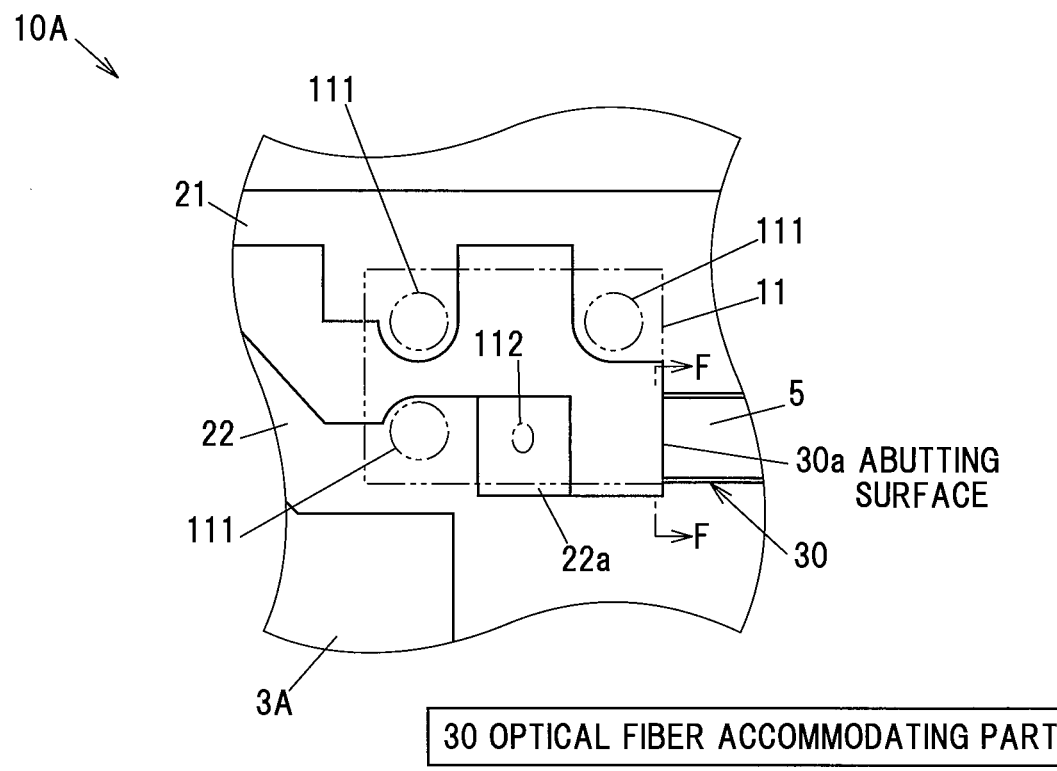
FIG. 7A is a partial enlarged view of a photoelectric conversion element and a peripheral part of an optical wiring substrate according to the second embodiment of the invention.
Figure 7B:
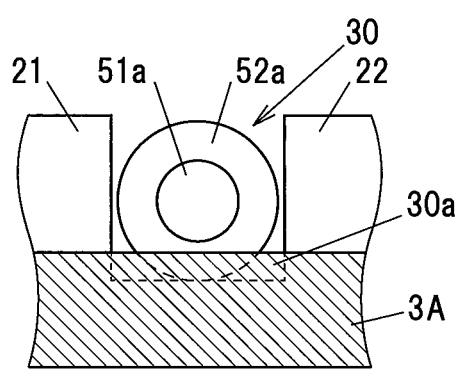
FIG. 7B is a cross-sectional view taken along the line F-F in FIG. 7A.

FIG. 6A is a cross-sectional view schematically showing an optical module according to a second embodiment of the invention, and FIG. 6B is a partial enlarged view of E part in FIG. 6A. FIG. 7A is a partial enlarged view of a photoelectric conversion element and a peripheral part of an optical wiring substrate according to the second embodiment of the invention, and FIG. 7B is a cross-sectional view taken along the line F-F in FIG. 7A. Further, FIG. 7A shows the outline of the photoelectric conversion element 11 by an alternate long and two short dashes line.

The optical wiring substrate 10A according to the embodiment is configured such that the optical fiber accommodating part 30 is formed over the whole of the conductor layer 2 in the thickness direction and a part of the insulation layer 3A in the thickness direction. Namely, the optical fiber accommodating part 30 is configured such that in the conductor layer 2, it passes through the conductor layer 2 over the whole thereof in the thickness direction, and in the insulation layer 3A, it does not pass through the insulation layer 3A over the whole thereof in the thickness direction, but a part thereof remains as the bottom surface 30b. The optical fiber 5 is supported by the bottom surface 30b of the optical fiber accommodating part 30.

In one end part (end edge) of the optical fiber accommodating part 30 in the longitudinal direction, an abutting surface 30a on which the end surface 5a of the optical fiber 5 inserted is abutted is formed so as to be perpendicular to the bottom surface 30b. As shown in FIGS. 6B and 7B, the optical fiber 5 accommodated in the optical fiber accommodating part 30 is configured such that the end surface 52a of the clad 52 is abutted on the abutting surface 30a. The end surface 51a of the core 51 is exposed between the first wiring pattern 21 and the second wiring pattern 22, and faces the reflecting surface 22a formed in the second wiring pattern 22.

FIGS. 8A to 8D are cross-sectional views schematically showing a forming process of the optical wiring substrate 10A according to the second embodiment of the invention.

The manufacturing process of the optical wiring substrate 10A according to the embodiment includes the first step of forming the base conductor layer 24 on the main surface 3a of the insulation layer 3A, the second step of removing a part of the base conductor layer 24 so as to form wiring patterns (the first wiring pattern 21, the second wiring pattern 22 and the semiconductor circuit element wiring pattern 23), and forming a concave part 241 that becomes the optical fiber accommodating part 30, the third step of forming the inclined surface 24a in the base conductor layer 24, the fourth step of removing the insulation layer 3A corresponding to the bottom surface of the concave part 241, thereby forming the optical fiber accommodating part 30, and forming the abutting surface 30a in the one end part (the end edge) of the optical fiber accommodating part 30, and the fifth step of laminating the Ni plating layer 25 and the gold plating layer 26 on the front surface 24b and the inclined surface 24a of the base conductor layer 24. Hereinafter, the first to fifth steps will be explained in more detail.

Figure 8A:
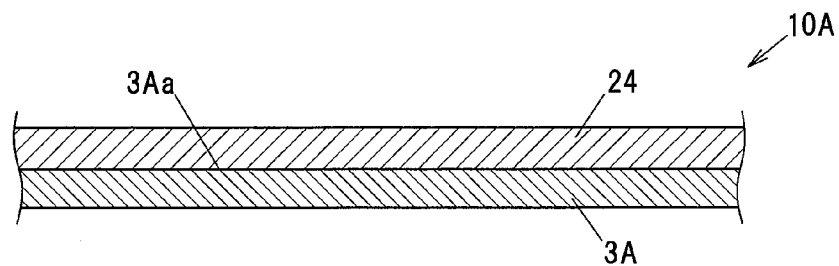
FIGS. 8A to 8D are cross-sectional views schematically showing a forming process of the optical wiring substrate according to the second embodiment of the invention.

As shown in FIG. 8A, in the first step of the embodiment, the base conductor layer 24 is formed on the whole surface of the main surface 3Aa of the insulation layer 3A, for example, by adhesion, vapor deposition, or electroless plating. Also in the embodiment, the base conductor layer 24 is comprised of copper (Cu) as a main component that has a good electrical conductivity similarly to the first embodiment.

Figure 8B:
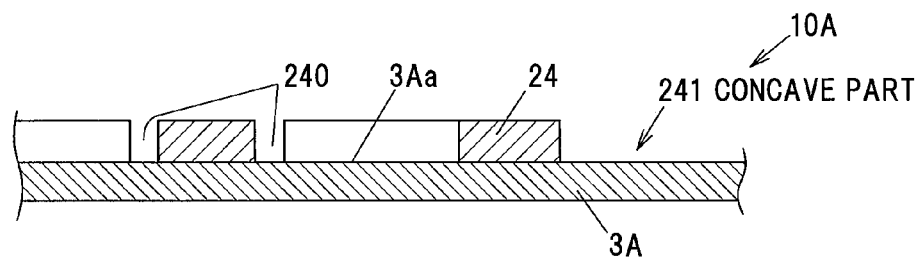

As shown in FIG. 8B, in the second step, a part of the base conductor layer 24 is removed by etching so as to respectively form the first wiring pattern 21, the second wiring pattern 22 and the semiconductor circuit element wiring pattern 23, and to form the concave part 241 that becomes the accommodating part 30. Regions of the base conductor layer 24 except for a part corresponding to the removed part 240 and a part corresponding to the concave part 241 are coated with a resist, and the parts of the base conductor layer 24 which are not coated with the resist are dissolved by etching. Thereby the base conductor layer 24 corresponding to the removed part 240 and the concave part 241 is dissolved so as to leave only the base conductor layer 24 corresponding to the first wiring pattern 21, the second wiring pattern 22, the semiconductor circuit element wiring pattern 23 and the concave part 241.

Figure 8C:
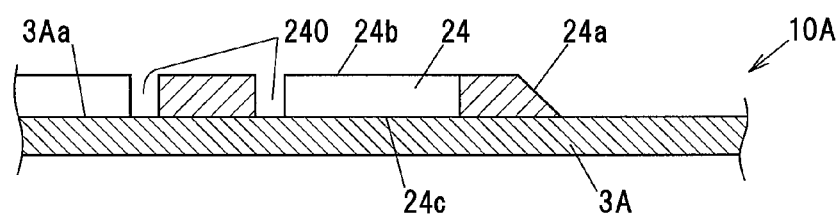

As shown in FIG. 8C, in the third step, similarly to the third step of the first embodiment, the base conductor layer 24 is cut obliquely from the front surface 24b to the rear surface 24c of the base conductor layer 24, thereby the inclined surface 24a is formed.

Figure 8D:
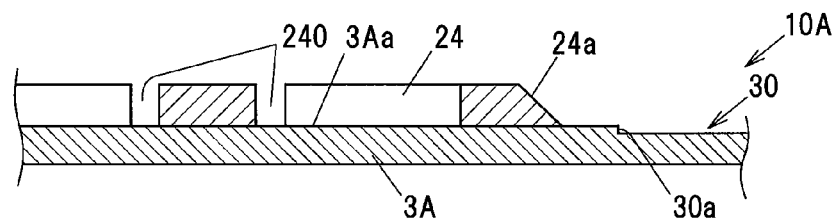

As shown in FIG. 8D, in the fourth step, a laser light is irradiated from a perpendicular direction to the main surface 3a of the insulation layer 3A corresponding to the bottom surface of the concave part 241. By the irradiation of the laser light, the accommodating part 30 that accommodates the end part of the optical fiber 5 and the abutting surface 30a are formed in the insulation layer 3A. The intensity of the laser light is an intensity that a part of the insulation layer 3A in the thickness direction can be cut but the whole of the insulation layer 3A in the thickness direction is not cut by the irradiation of the light. Accordingly, a part of the insulation layer 3A that remains without being removed by the irradiation of the laser light is formed as the bottom surface 30b of the optical fiber accommodating part 30.

In the fifth step, similarly to the fourth embodiment, platings of nickel (Ni) and gold (Au) are applied to the front surface 24b and the surface of the inclined surface 24a of the base conductor layer 24, so as to form the Ni plating layer 25 and the gold plating layer 26. The reflecting surface 22a is formed on the outermost surface of the gold plating layer 26.

(Operation and Advantage of the Second Embodiment)

In the above-mentioned second embodiment, the following operation and advantage other than the operation and advantage (1) of the first embodiment can be also obtained.

The abutting surface 30a is formed in the one end part of the optical fiber accommodating part 30 formed in the insulation layer 3A, thus the abutting surface 30a can be formed together in the step of forming the optical fiber accommodating part 30 in the forming process of the optical wiring substrate 10, so as to lead to improvement in workability.

(Summary of the Embodiments)

Next, the technical idea grasped from the above-explained embodiments will be described by utilizing the reference numerals and the like in the embodiments. However, the respective reference numerals and the like in the following description do not limit the constitutional components in the scope of the claim to the members concretely shown in the embodiments.

[1] An optical wiring substrate (10, 10A) comprising an insulation layer (3, 3A) comprised of a resin, an conductor layer (2) laminated on the insulation layer (3, 3A) and comprised of a metal, wherein an optical fiber accommodating part (20, 30) configured to accommodate an end part of an optical fiber (5) is formed in the conductor layer (2), or in the conductor layer (2) and the insulation layer (3, 3A), a reflecting surface (22a) configured to reflect a light that propagates through the optical fiber (5) is formed in the conductor layer (2) so as to be inclined relative to the insulation layer (3, 3A), and an abutting surface (211a, 221a, 30a) configured such that the tip of optical fiber (5) inserted is abutted thereon is formed in one end part of the optical fiber accommodating part (20, 30).

[2] The optical wiring substrate (10) according to [1], wherein the abutting surface (211a, 221a, 30a) is formed in a part of the conductor layer (2).

[3] The optical wiring substrate (10A) according to [1], wherein the abutting surface (30a) is formed in a part of the insulation layer (3A).

[4] An optical module (1, 1A) comprising the optical wiring substrate (10, 10A) according to any one of [1] to [3], and a photoelectric conversion element (11).

[5] A manufacturing method of the optical wiring substrate (10) according to [2] comprising forming the conductor layer (2) on the insulation layer (3), removing a part of the conductor layer (2) so as to form the wiring patterns (the first wiring pattern (21), the second wiring pattern (22) and the semiconductor circuit element wiring pattern (23)) and the optical fiber accommodating part (20), and forming the abutting surface (the first abutting surface 211a and the second abutting surface 221a) in one end of the optical fiber accommodating part (20), and forming an inclined surface (24a) constituting the reflecting surface (22a) in a part of the wiring pattern (the second wiring pattern 22).

[6] A manufacturing method of the optical wiring substrate (10A) according to [3] comprising forming the conductor layer (2) on the insulation layer (3A), removing a part of the conductor layer (2) so as to form the wiring patterns (the first wiring pattern 21, the second wiring pattern 22 and the semiconductor circuit element wiring pattern 23), and forming a concave part (241) that becomes the optical fiber accommodating part (30), and forming an inclined surface (24a) constituting the reflecting surface (22a) in a part of the wiring pattern (the second wiring pattern 22), and removing the insulation layer (3A) corresponding to a bottom surface of the concave part (241) so as to form the optical fiber accommodating part (30), and forming the abutting surface (30a) in one end of the optical fiber accommodating part (30).

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, in the above-mentioned embodiments, a configuration that only one optical module 1, 1A is mounted on the optical wiring substrate 10, 10A has been explained, but not limited to this, a plurality of optical module structures may be mounted on the optical wiring substrate 10. 10A.

In addition, in the above-mentioned embodiments, the optical fiber 5 is configured such that the peripheral surface of the clad 52 is in contact with the inner surface 40a of the concave part 40 of the holding member 4 and the main surface 3a of the insulation layer 3, but the optical fiber 5 is fixed by adhesives and the like filled in the concave part 40, thus the peripheral surface of the clad 52 does not have to be in contact with the inner surface 40a of the concave part 40 of the holding member 4 and the main surface 3a of the insulation layer 3.

In addition, in the above-mentioned embodiments, the optical wiring substrate 10, 10A is mainly comprised of the insulation layer 3, 3A and the conductor layer 2, but not limited to this, a conductor layer in which wiring patterns are formed may be also formed in the rear surface side of the insulation layer 3, 3A. This configuration can improve the arrangement of wiring.

In addition, in the above-mentioned embodiment, a configuration that the base conductor layer 24 is comprised of copper (Cu) has been explained, but not limited to this, a part or the whole of the base conductor layer 24 may be comprised of, aluminum (Al). Also, materials of the plating layers (the Ni plating layer 25 and the gold plating layer 26) are not limited to the above-mentioned materials. Materials of the insulation layer 3 are not limited to polyimide, but, for example, polyethylene terephthalate (PET) may be also used.

In addition, in the above-mentioned embodiment, the photoelectric conversion element 11 and the semiconductor circuit element 12 are mounted on the optical wiring substrate 10 by flip-chip mounting, but not limited to this, for example, those can be mounted thereon by wire bonding.

What is claimed is:

1. An optical wiring substrate, comprising:
an insulation layer comprising a resin;
an conductor layer formed on the insulation layer and comprising a metal; and
an optical fiber accommodating part configured to accommodate an end part of an optical fiber,
wherein the conductor layer further comprises a reflecting surface configured to be inclined relative to the insulation layer so as to reflect a light that propagates through the optical fiber,
wherein the optical fiber accommodating part comprises at one end part thereof an abutting surface configured such that an end surface of a tip of the optical fiber inserted is abutted thereon,
wherein the conductor layer constitutes both side surfaces of the optical fiber accommodating part and a wiring pattern configured to be electrically connected to a photoelectric conversion element that is electrically connectable to a semiconductor circuit element,
wherein the abutting surface is formed as a part of the conductor layer.

2. An optical wiring substrate, comprising:
an insulation layer comprising a resin;
an conductor layer formed on the insulation layer and comprising a metal; and
an optical fiber accommodating part configured to accommodate an end part of an optical fiber,
wherein the conductor layer further comprises a reflecting surface configured to be inclined relative to the insulation layer so as to reflect a light that propagates through the optical fiber,
wherein the optical fiber accommodating part comprises at one end part thereof an abutting surface configured such that a tip of optical fiber inserted is abutted thereon,
wherein the conductor layer constitutes both side surfaces of the optical fiber accommodating part and a wiring pattern configured to be electrically connected to a photoelectric conversion element that is electrically connectable to a semiconductor circuit element,
wherein the abutting surface is formed as a part of the insulation layer.

3. An optical module, comprising:
the optical wiring substrate according to claim 2;
the semiconductor circuit element; and
the photoelectric conversion element.

4. A manufacturing method of an optical wiring substrate, the optical wiring substrate comprising:
an insulation layer comprising a resin;
an conductor layer formed on the insulation layer and comprising a metal; and
an optical fiber accommodating part configured to accommodate an end part of an optical fiber,
wherein the conductor layer further comprises a reflecting surface configured to be inclined relative to the insulation layer so as to reflect a light that propagates through the optical fiber,
wherein the optical fiber accommodating part comprises at one end part thereof an abutting surface configured such that a tip of optical fiber inserted is abutted thereon,
wherein the abutting surface is formed as a part of the insulation layer,
the method comprising:
forming the conductor layer on the insulation layer;
removing a part of the conductor layer so as to form a wiring pattern and a concave part as the optical fiber accommodating part; and
forming an inclined surface as the reflecting surface on a part of the wiring pattern; and
removing the insulation layer corresponding to a bottom surface of the concave part so as to form the optical fiber accommodating part and to form the abutting surface at one end of the optical fiber accommodating part.

5. The optical wiring substrate according to claim 1, wherein the optical fiber accommodating part passes through the conductor layer over a whole of the conductor layer in a thickness direction and a main surface of the insulation layer is exposed.

* * * * *